US008393179B2

(12) United States Patent
Schmidt et al.

(10) Patent No.: US 8,393,179 B2
(45) Date of Patent: Mar. 12, 2013

(54) METHOD FOR PRODUCING A SEMIFINISHED PRODUCT FROM SYNTHETIC QUARTZ GLASS

(75) Inventors: Sven Schmidt, Brehna (DE); Udo Peper, Halle/Saale (DE); Andreas Helm, Thalheim (DE); Juergen Roeper, Roitzsch (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 781 days.

(21) Appl. No.: 12/227,652

(22) PCT Filed: May 23, 2007

(86) PCT No.: PCT/EP2007/054995
§ 371 (c)(1),
(2), (4) Date: Jan. 6, 2009

(87) PCT Pub. No.: WO2007/135166
PCT Pub. Date: Nov. 29, 2007

(65) Prior Publication Data
US 2009/0183526 A1    Jul. 23, 2009

(30) Foreign Application Priority Data

May 24, 2006 (DE) .......................... 10 2006 024 831

(51) Int. Cl.
*C03B 37/10* (2006.01)
(52) U.S. Cl. .............................. 65/427; 65/422; 65/426
(58) Field of Classification Search ............... 65/422, 65/426, 427
See application file for complete search history.

(56) References Cited

U.S. PATENT DOCUMENTS 4,936,893 A * 6/1990 Yamada et al. ............ 65/374.11
4,969,941 A * 11/1990 Kyoto et al. ................... 65/391
(Continued)

FOREIGN PATENT DOCUMENTS
DE    42 04 406 A1    8/1993
DE    100 41 467 C1    2/2002
(Continued)

OTHER PUBLICATIONS
Machine translation of description of WO 02/08129.*
(Continued)

*Primary Examiner* — Matthew Daniels
*Assistant Examiner* — Russell Kemmerle, III
(74) *Attorney, Agent, or Firm* — Tiajoloff & Kelly LLP

(57) ABSTRACT

Method for producing a semifinished product from synthetic quartz glass Methods for producing a semifinished product from synthetic quartz glass by plastic deformation of a softened $SiO_2$ mass in a melt mold are known. Starting from this, to avoid fusion defects as much as possible and to obtain semifinished products of quartz glass in a reproducibly high quality, a method is suggested that comprises the following steps: (a) providing a porous $SiO_2$ soot body, (b) zonewise sintering of the $SiO_2$ soot body in the melt mold at a sintering temperature and during a sintering period with formation of a completely sintered transparent quartz glass body, and directly thereafter (c) shaping the sintered quartz glass body by softening in the melt mold with formation of a viscous quartz glass mass which fills the volume of the melt mold entirely or partly, and (d) cooling the quartz glass mass and removing the mass from the melt mold with formation of the semifinished product.

15 Claims, 2 Drawing Sheets

U.S. PATENT DOCUMENTS

Figure 1:
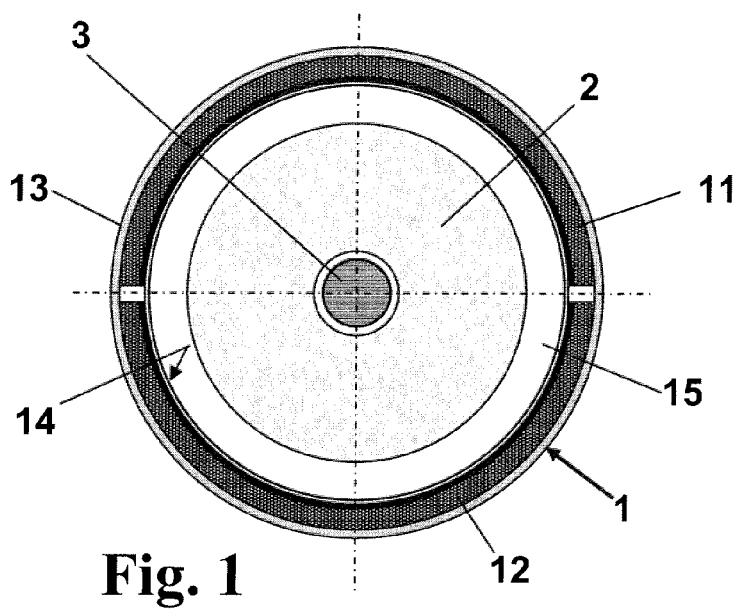

| | | | |
|---|---|---|---|
| 5,160,521 A | * | 11/1992 | Tran ................................ 65/389 |
| 5,443,607 A | | 8/1995 | Englisch et al. |
| 6,265,115 B1 | | 7/2001 | Berkey et al. |
| 2007/0271964 A1 | | 11/2007 | Huenermann |

FOREIGN PATENT DOCUMENTS

| | | |
|---|---|---|
| DE | 10 2004 035 086 A1 | 2/2006 |
| EP | 1 340 722 A1 | 9/2003 |
| JP | 05-270848 | 10/1993 |
| JP | 2001-199733 | 7/2001 |
| WO | WO 02/08129 A1 | 1/2002 |

OTHER PUBLICATIONS espacenet abstract for JP 2001-199733 A1 (Jul. 24, 2001).
espacenet abstract for JP 5-270848 A1 (Oct. 19, 1993).

* cited by examiner

METHOD FOR PRODUCING A SEMIFINISHED PRODUCT FROM SYNTHETIC QUARTZ GLASS

The present invention relates to a method for producing a semifinished product from synthetic quartz glass by plastic deformation of a softened $SiO_2$ mass in a melt mold.

Components for use in semiconductor manufacture, optical components or preforms for optical fibers for telecommunications are made from the semifinished product consisting of synthetic quartz glass.

Synthetic quartz glass is normally produced by flame hydrolysis or oxidation of a silicon-containing start compound by using deposition burners. An established start substance for manufacturing synthetic quartz glass is silicon tetrachloride ($SiCl_4$). However, many other silicon organic compounds are known from which $SiO_2$ can be formed by hydrolysis or by oxidation. Chlorine-containing or chlorine-free silanes, silazanes or polysiloxanes should here be mentioned as examples.

Known manufacturing methods are the VAD method (vapor phase axial deposition), the OVD method (outside vapor phase deposition) or plasma-supported deposition methods, such as the POD method (plasma outside deposition). Other methods use molds in which quartz glass bodies are built up from the bottom to the top by vertical deposition of $SiO_2$ particles and direct vitrification. In all of these procedures $SiO_2$ particles are produced by means of one or several deposition burners and are deposited layerwise on a carrier moving relative to a burner flame. At an adequately high temperature in the area of the carrier surface the $SiO_2$ particles are directly vitrified ("direct vitrification"). By contrast, in the so-called "soot method" the temperature is so low during deposition of the $SiO_2$ particles that a porous $SiO_2$ soot body is obtained that is sintered in s separate method step into transparent quartz glass. In the end both direct vitrification and soot method yield a dense, transparent synthetic quartz glass of high purity. The present invention relates to the manufacture of synthetic glass via the intermediate stage of the soot body.

The soot body is a hollow cylinder (or a solid cylinder of porous $SiO_2$ soot) which is obtained according to the above-mentioned method. As a rule, soot bodies have a high content of hydroxyl groups (OH groups) due to the manufacturing process. These have an impact on the optical transmission of the resulting quartz glass and on the viscosity of the quartz glass and its resistance to short-wave UV radiation. General attention is therefore paid in the making of synthetic quartz glass to the observation of a predetermined content of hydroxyl groups, and a plurality of methods have been suggested for minimizing the hydroxyl group content in the soot body or for setting it to a predetermined value. For instance, the porous soot body is subjected to a dehydration treatment in a chlorine-containing atmosphere at a high temperature of around 1000° C., which leads to a substitution of OH groups by chlorine.

A body consisting of transparent quartz glass is produced by sintering (=vitrification) from the pretreated soot body. As a rule, the soot body which has been dried or pretreated in another way is introduced for this purpose into an evacuable vitrification furnace and is sintered therein with formation of a transparent quartz glass body, and said body is subsequently brought into the predetermined final shape of the semifinished product by mechanical shaping or by hot deformation.

Hot deformation is often accompanied by homogenization measures for reducing striae and layers. For instance, DE 42 04 406 A1 discloses a multi-step deformation process in which a twisting bar of quartz glass is introduced into a casting mold of graphite for eliminating an axial layer structure, the casting mold being shaped in the form of an inverted "T", with a vertically oriented supply nozzle which at its bottom end branches off at two sides into a horizontally oriented tubular outflow mold of a square cross-section. The twisting bar is softened within the supply nozzle, thereby collapsing under its own weight into the horizontal outflow mold such that it is shaped into a bar-shaped quartz glass cylinder of a square cross-section in which the remaining layers extend in parallel with the longitudinal axis of the rod and can be removed easily by twisting about the longitudinal axis.

DE 100 41 467 C1 suggests that dehydration treatment and vitrification of the soot body should be carried out in a joint furnace and that during vitrification of the soot body the final form of the semifinished product should simultaneously be set by plastic shaping. In one embodiment, a gas-permeable graphite mold is used that comprises an upper portion with accommodating means of a wide cross-section adapted to the outer diameter of the soot body, the upper portion passing via a funnel-shaped transition into a lower portion of a narrower cross-section. The lower portion of the graphite mold is adapted to the outer diameter of the semifinished quartz glass product to be produced and defines the final shape thereof. The soot body to be vitrified is inserted into the accommodating portion of the graphite mold and is first held in an upper colder portion of a furnace and is there acted upon with chlorine gas. The temperature prevailing during the chlorine treatment is about 950° C. Following this process step the soot body is lowered together with the graphite mold into furnace regions having an elevated temperature around 1350° C. and is presintered in a helium atmosphere for a period of about 12 h. In the presintering process, a certain volume contraction of the soot body is observed. The soot body is subsequently vitrified at a temperature of about 1750° C. in that the graphite mold, including the presintered soot body, is lowered some way further towards the furnace portion having an even higher temperature. After a residence time of 8 hours in this position the presintered soot body is softened to such an extent that it flows off under its own weight through the funnel-shaped transition into the lower part of the mold. The sluggish flow-off can be promoted by pressure exerted from above. After cooling the graphite mold is opened and a quartz glass molding is removed that can be used without further finishing work as a block-shaped semifinished product for producing quartz glass components for optics or for semiconductor manufacture.

However, when the viscous $SiO_2$ mass flows off into the lower portion of the graphite mold, unforeseeable bubble inclusions or dislocations may arise that are noticed as striae or bubble nests. Such fusion defects impair the quality of the final product. For instance, bubbles reduce the resistance of quartz glass components to etching processes, as are usual in semiconductor manufacture. Such fusion defects make the semifinished product unusable and must be removed in a troublesome way.

It is therefore the object of the present invention to improve the known method such that fusion defects are avoided as much as possible and semifinished quartz-glass products are obtained in a high reproducible quality.

Starting from the method of the above-mentioned type this object is achieved according to the invention by a method comprising the following steps:
(a) providing a porous $SiO_2$ soot body (2),
(b) zonewise sintering of the $SiO_2$ soot body (2) in the melt mold (1) at a sintering temperature and during a sintering period with formation of a completely sintered transparent quartz glass body (5), and directly thereafter (c) shaping the sintered quartz glass body (5) by softening in the melt mold (1) with formation of a viscous quartz glass mass (8) which fills the volume of the melt mold (1) entirely or partly, and (d) cooling the quartz glass mass (8) and removing the mass from the melt mold (1) with formation of the semifinished product (6).

Like the above-described known method, the method of the invention starts from a soot body which after drying is sintered in one joint operation in a melt mold and shaped without any substantial intermediate cooling into the semifinished product. This shortens the process duration and saves energy. In contrast to the prior art, however, the shaping process in the method of the invention dos not take place at the same time as the sintering of the $SiO_2$ soot body, but only after completion of the sintering process. Sintering and shaping are process steps strictly separated in time within the same work step.

Shaping will only be performed after the sintering into a transparent quartz glass body has been completed entirely. "Shaping" does here not mean shrinkage to which the soot body is subjected by the sintering (and possible collapsing), but means a change in shape effected by the viscous flowing of the vitrified body. It has here been found that a shaping process without bubbles and striae is only possible if a glass body is present after sintering, for the defined separation and time sequence of sintering process and shaping process avoid inclusions of gases as are e.g. observed when still porous soot material of viscous quartz glass mass is enveloped and enclosed.

The shaping of the completely sintered quartz glass body is immediately carried out after vitrification and preferably without any cooling of the sintered soot body in the same melt mold, but at an increased temperature. The softened mass of the sintered soot body is distributed in the melt mold, filling the inner volume thereof completely or in part, so that after cooling of the quartz glass mass the semifinished product can be removed from the melt mold.

It has turned out to be particularly advantageous when the soot body is sintered, starting from the top downwards, and the sintered quartz glass body is shaped, starting from the bottom upwards.

The soot body to be sintered is first moved together with the melt mold from the bottom to the top through a heating zone, or the heating zone is guided along the soot body and the melt mold, starting from the top downwards. While the soot body is being sintered, the volume contracts to some extent, but without any substantial change in the ratio of the soot body dimensions relative to one another, i.e. without any substantial change in the initial geometrical shape of the soot body. Sintering from the top to the bottom has the advantage that the lowermost portion of the soot body is sintered last, and that this portion in the still hot state is softened directly thereafter and shaped.

In this connection it has turned out to be particularly advantageous when shaping is performed in a heating zone having a length not more than half the length of the quartz glass body to be shaped.

As a consequence, the upper portion of the quartz glass body that is projecting out of the heating zone is so cold at the beginning of the shaping process that there is no softening or shaping in this portion. This ensures a portionwise softening of the quartz glass body starting from the bottom, and a gradually upwardly progressing defined shaping process. In this connection attention must also be paid that the high softening temperature required for softening quartz glass may also lead to nucleation and an undesired growth of cristobalite crystals in the quartz glass. It is therefore desired that quartz glass is exposed to particularly high temperatures only as long as needed.

It has turned out to be useful when during zonewise sintering the soot body is supplied to a heating zone at a feed rate in the range between 2 mm/min and 10 mm/min from the bottom to the top, with the sintering temperature being set in the range between 1400° C. and 1600° C.

The feed rate in the range between 2 mm/min and 10 mm/min in combination with heating zone lengths of at least 30 cm yields a dwell time of the soot body in the heating zone that ensures complete sintering at least for typical dimensions of the soot body (with an outer diameter in the range of from 300 mm to 500 mm).

In a particularly preferred variant of the method, shaping of the sintered quartz glass body comprises a first shaping step during which a lower portion of the quartz glass body is shaped at a softening temperature that is lower on average, and a second shaping step in which an upper portion of the quartz glass body is shaped at a softening temperature that is higher on average.

In this variant of the method, the shaping process is thus composed of at least two successive phases differing in their mean softening temperature from one another. During the first shaping step the lower portion of the quartz glass body to be shaped is exposed to a comparatively lower softening temperature resulting in a comparatively slow, cautious plastic deformation under the weight pressure of the sintered quartz glass body. During transition to the second shaping step the softening temperature is increased so that the predominantly plastic deformation of the upper portion of the sintered quartz glass body into the semifinished product takes place. The objective of the successive shaping steps is the adaptation of the viscosity (internal friction) of the quartz glass to the also decreasing weight of the quartz glass body that has not been shaped yet, since the weight thereof decreases due to the quartz glass body flowing out into the melt mold, with the original length of the quartz glass body decreasing in this process. A defined decrease in the viscosity with the decreasing weight additionally counteracts the formation of fusion defects, such as dislocations or helically arranged bubble rings.

Preferably, the quartz glass body is already introduced during sintering into the corresponding heating zone for the shaping process, so that the temperature thereof has just to be raised to the softening temperature.

In this respect it has also turned out to be advantageous when the softening temperature in the first shaping step is increased, starting from the sintering temperature prevailing after completion of the sintering step, at a heating rate between 0.01° C./min and 0.08° C./min until it is higher within the range of 20° C. to 100° C. than the sintering temperature.

The low heating rate and the comparatively slight temperature increase in comparison with the sintering temperature result in a cautious, slow and comparatively insignificant shaping of the lower portion of the quartz glass body, thereby taking into account the still great weight of the still unshaped part of the quartz glass body. Due to the slow deformation gas inclusions or similar fusion defects are reliably avoided during the first shaping step. During the first shaping step the lower portion of the quartz glass body will broaden until it impinges on the inner wall of the melt mold, which will then be filled up gradually with viscous quartz glass mass. With a heating up that is too fast, a stronger temperature gradient is observed across the radial cross-section of the quartz glass body, so that the outer portion of the quartz glass shows not only the tendency towards a stronger cristobalite formation due to this overheating, but also softens at a faster pace and its supporting action gets lost, which leads to a fast follow-up slipping of the remaining quartz glass body and to dislocations, or the like. The slow heating up additionally facilitates the outdiffusion of gaseous components, which components may otherwise contribute to bubble formation.

For the reasons given above the preferred variant of the method in which the quartz glass body is heated up continuously is superior to an alternative procedure in which the temperature is increased in steps. This applies equally to the second shaping step, which step shall now be studied in more detail.

In the second shaping step, the softening temperature is increased, starting from the lower softening temperature prevailing after completion of the first shaping step, at a heating rate between 0.08° C./min and 0.5° C./min until it is higher within the range of 20° C. to 150° C. than the lower softening temperature.

A major proportion of the plastic deformation of the quartz glass body will only take place in the second shaping step on the basis of the deformation already performed in the first shaping step, and this proportion will therefore be smaller than it would be without the first shaping step. The second shaping step substantially just regards the upper, still unshaped portion of the quartz glass body. It has been found that dislocations and uncontrollable deformations are thereby avoided. The continuously decreasing weight of the still unshaped quartz glass body portion permits a higher heating rate between 0.08° C./min and 0.5° C./min. Due to the faster heating rate in the second shaping step the interval during which the quartz glass is held at particularly high temperatures is minimized and the risk of cristobalite formation is thereby reduced.

On account of the defined successive sequence of the total shaping process, dislocations and gas inclusions are again avoided. This procedure prevents above all a situation where portions originally located on the surface of the $SiO_2$ soot body can pass into the interior of the deformed quartz glass body, where they would otherwise produce impurities and bubble nests.

Preferably, the shaping of the sintered quartz glass body comprises a third shaping step at a substantially constant softening temperature for a period of time of from 15 min to 200 min.

The third shaping step directly follows the second shaping step and is carried out at a substantially constant temperature. This temperature corresponds to the softening temperature after completion of the second shaping step. It may however also be considerably above said temperature. Prior to the third shaping step the shaping process is substantially completed. There is only a smoothing of the walls and of the upper side of the semifinished product for which a holding phase in the range of the higher softening temperature is enough.

This measure will be particularly efficient if the shaped quartz glass body is uniformly heated over its whole length in the third shaping step.

The heating of the almost completely shaped quartz glass body is here carried out in a temperature field that is as homogeneous as possible. The shaped quartz glass body and the melt mold are therefore located in a heating zone that is at least half as long as the melt mold and the quartz glass body itself that is shaped therein.

It has turned out to be particularly advantageous when the soot body is dried in a chlorine-free atmosphere either in vacuum or in an inert gas stream.

The soot body is here substantially dried thermally, supported by a negative pressure. The loading of the soot body with chlorine and thus accompanying disadvantageous impacts on the quartz glass of the semifinished product are thereby prevented.

A variant of the method has turned out to be particularly useful in which the soot body has an inner bore into which an elongated carrier body extends during sintering according to method step (b) and during shaping according to method step (c).

The carrier body extending through the inner bore of the soot body may be instrumental in handling the soot body. It is known that such carrier bodies are connected to a plate gripping the soot body from underneath. During sintering, however, attention must be paid that the soot body does not shrink onto the carrier body as this might impair the subsequent shaping of the sintered quartz glass body.

By contrast, during shaping the carrier body serves as a shaping element for the inner bore of the semifinished body. It may have any desired cross-section, e.g. it may be round, oval or polygonal, particularly rectangular or hexagonal. By the way, this is also true for the inner wall of the melt mold.

The method of the invention preferably uses a soot body which prior to sintering according to method step (b) has a density ranging from 490 kg/m$^3$ to 640 kg/m$^3$.

It has been found that only at a density of less than 640 kg/m$^3$ an adequate drying is possible within appropriate intervals, particularly in cases where a chlorine-supported drying step is omitted. An adequate drying prevents the formation of bubbles in the subsequent shaping process. Densities below the indicated lower limit will make it more difficult to shape the sintered quartz glass body without any bubbles.

Furthermore, it has turned out to be useful when prior to sintering according to method step (b) the soot body has a ratio Lm<20 mm/kg, where "L" is the length of the soot body and "m" is the mass of the soot body.

The ratio L/m of less than 20 mm/kg results in advantageous shaping properties with respect to the prevention of fusion defects, such as bubble nests and dislocations.

Furthermore, it has turned out to be advantageous when prior to sintering according to method step (b) the soot body is fitted into the melt mold such that a surrounding gap with a width of not more than 50 mm is created relative to the inner wall of the melt mold.

It has been found that a large gap between the inner wall of the melt mold and the outer wall of the sintered quartz glass bodies may lead to dislocations in the shaping process. These will be avoided in a particularly reliable manner if the gap width between inner wall of the melt body and soot body does not exceed 50 mm.

Advantageously, a melt mold is used having a side wall composed of at least two segments held together by means of at least one externally surrounding clamping ring.

Quartz glass is distinguished by a thermal expansion coefficient that is much smaller than that of suitable materials for the melt mold, particularly graphite, silicon carbide, ceramic materials or high-melting metals such as molybdenum, tungsten or platinum. Therefore, during cooling the melt mold will shrink onto the shaped quartz glass body, possibly breaking in this process. The segmented configuration of the melt mold is instrumental in avoiding such a situation. The segments are held together by means of an externally surrounding clamping ring which preferably consists of CFC (carbon fiber reinforced carbon). This is a mechanically stable material that shows enough strength also in the case of small wall thicknesses and therefore permits a compact shape of the melt mold.

A further improvement will be achieved if a melt mold of graphite is used having an inner wall lined at least in the area of its side wall with sheet-like graphite.

The sheet-like graphite is graphite in the form of foils, felt or preferably graphite paper. This lining of the side wall prevents or reduces a chemical reaction of silicon from the quartz glass with carbon under formation of SiC, which will damage the graphite mold and may have a disadvantageous impact on the shaping process.

The semifinished product obtained according to the method of the invention is distinguished by a small bubble content and a high etch resistance and is particularly suited for the manufacture of components for semiconductor production for use in a corrosive or etching environment.

Figure 3:
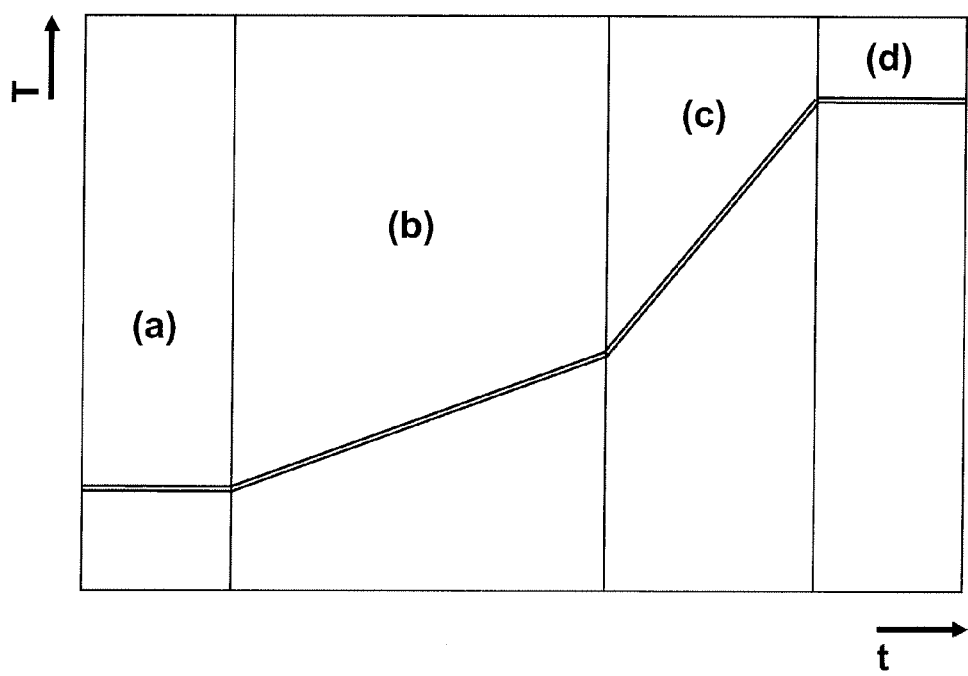
Figure 2:
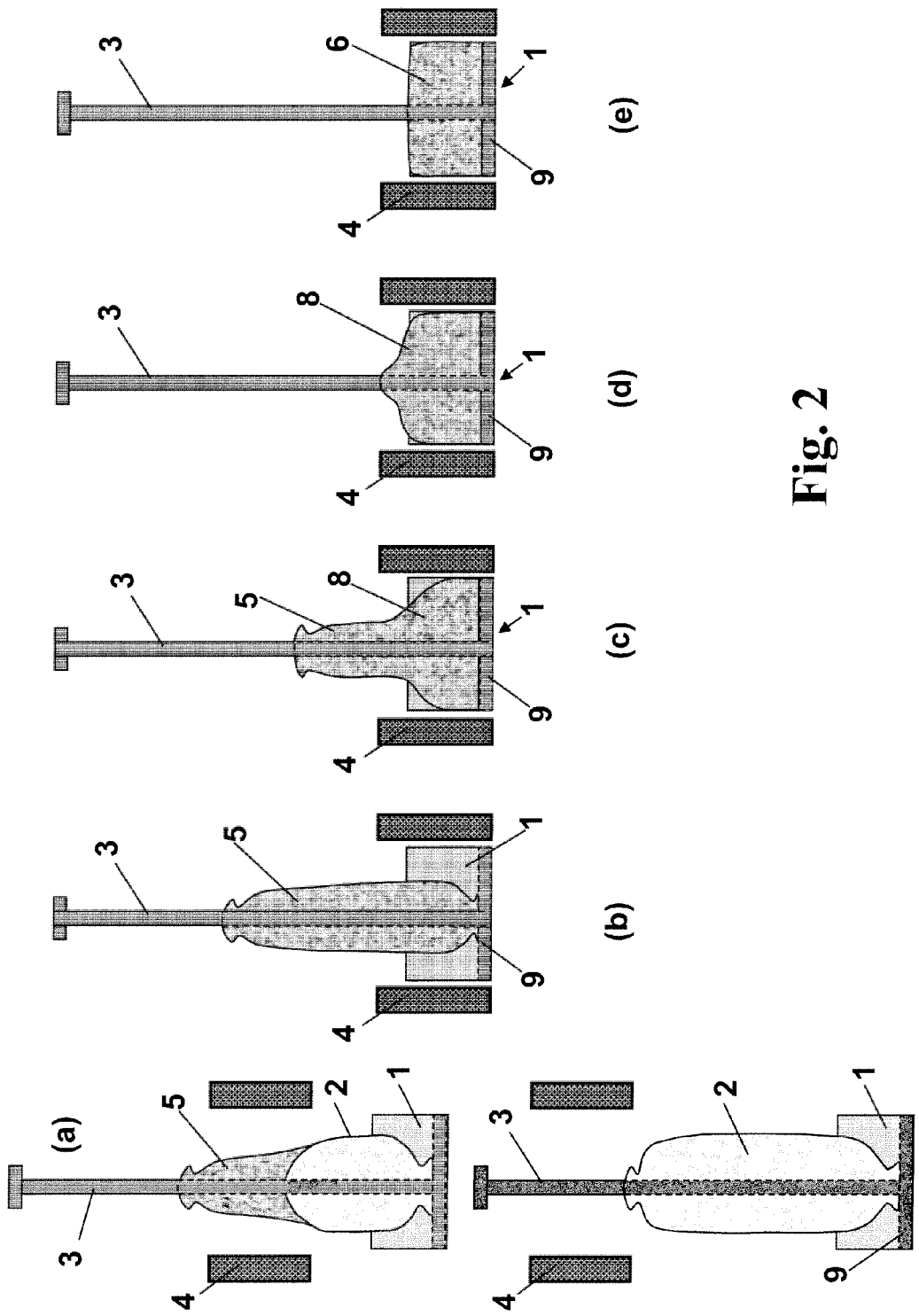

The invention shall now be explained in more detail with reference to embodiments and a drawing. Shown in detail in the drawing in schematic illustration is in FIG. 1 a soot body in a melt mold of graphite for performing the method of the invention, in a top view;

FIG. 2 an embodiment of the method according to the invention with reference to a process diagram; and FIG. 3 a typical temperature profile in performing the method of the invention.

FIG. 1 schematically shows a melt mold 1 made of gas-permeable graphite, which consists of a bottom plate and two graphite shells 11, 12 that form the side wall of the mold 1 and are fixed by means of holding rings on the bottom plate. The graphite shells 11, 12 are held together by means of an upper and a lower clamping ring 13 made from CFC. The gap between the shells 11, 12 is sealed by means of graphite felt. The inner wall thereof is completely lined with graphite paper 14. The melt mold 1 has an inner diameter of 450 mm and a height of 600 mm.

It serves to receive a hollow cylindrical $SiO_2$ soot body 2 through the inner throughhole of which a carrier tube 3 of graphite is extending that has a round cross-section and is connected to a bottom plate 9 on which the soot body 2 is positioned. The gap 15 between soot body 2 and inner wall of the melt mold 1 has a width of 25 mm.

The $SiO_2$ soot body 2 has been manufactured by means of a standard OVD method by outside deposition of $SiO_2$ particles on a mandrel rotating about its longitudinal axis, and attention has here been paid that a mean density of the soot body of about 500 kg/m$^3$ is obtained. The outer diameter of the soot body 2 is 400 mm and the ratio of the length of the soot body to its weight is 15 mm/kg. To remove hydroxyl groups that are present due to the manufacturing process, the soot body 2 was first dried at a temperature of 1000° C. in a nitrogen stream of 20 l/min for a period of time of 33 hours. This sets a mean hydroxyl group content of about 150 wt. ppm.

The carrier tube 3 serves to transport and mount the soot body 2 and simultaneously serves as a shaping element for the inner bore of the semifinished product that is to be formed. The outer diameter of the graphite tube 3 is 50 mm.

The process diagram in FIG. 2 shows method steps (a) through (e) for manufacturing a hollow cylindrical semifinished product 6 by means of the method according to the invention.

The melt mold 1 which is equipped with the soot body 2 is introduced into a vacuum furnace having a heating zone 4 which is formed by a susceptor having a length of 600 mm. The melt mold 1 is only schematically shown by way of its contour. In a first method step (a), the soot body 2 is sintered evenly, homogeneously and without any bubbles. To this end it is introduced together with the melt mold 1, starting with its upper end from below continuously and at a feed rate of 5 mm/min, into the heating zone 4 and is heated therein zonewise to a temperature of around 1510° C. A negative pressure of 0.1 mbar (absolute) is here maintained in the vacuum furnace.

FIG. 2(a) shows two process stages during sintering, once at the beginning of the sintering process (lower illustration) and once after about half of the sintering process has been completed (upper illustration).

As soon as the melt mold 1 has been fully positioned in the heating zone 4, the further advance movement is stopped, and the sintering process is completed by maintaining the sintering temperature for about another 60 min. This gives a dwell time of about 120 min within the heating zone 4 for each point of the soot body 2, so that the soot body 2 is sintered into a bubble-free body 5 of transparent quartz glass having an outer diameter of about 200 mm and a length of about 3 m. Attention is here paid that the soot body 2 does not shrink onto the carrier tube 3 during sintering, which might impair the subsequent remelting process.

This is followed by a first shaping step for deforming the lower portion of the quartz glass body 5, as illustrated in FIG. 2(c). The vacuum is maintained during the whole shaping process. The temperature of the heating zone 4 is slowly raised at a heating rate of 0.04° C./min from 1510° C. to 1558° C. The lower portion of the quartz glass body 5 is thereby softened and flows out into the melt mold 1. This mold is fully positioned inside the heating zone 4, resulting in a homogeneous temperature profile over the height of the melt mold 1.

After completion of this first heating and shaping phase (after about 1200 min) the weight of the quartz glass body 5 which is resting on the viscous quartz glass mass 8 and has not been deformed yet has been approximately halved in comparison with the start weight, and a second shaping step is now performed that substantially regards only the remaining upper portion of the quartz glass body 5. The temperature is here further raised at an increased heating rate of 0.25° C./min by 62° C. to 1620° C. During this heating phase that lasts for about 240 min, the remaining upper portion of the quartz glass body 5 will also subside or collapse almost entirely under its own weight into the melt mold 1, thereby filling the inner volume thereof almost completely, as shown in FIG. (e).

The objective of these two shaping steps is an adaptation of the viscosity of the quartz glass mass 8 inside the melt mold 1 to the gradually decreasing weight of the still unshaped part of the quartz glass body 5. The defined, slow and cautious reduction of the viscosity counteracts the formation of fusion defects, particularly dislocations and helical bubble rings.

This is followed in a third shaping step by the previously achieved temperature of 1620° C. being maintained for another two hours. The upper side of the shaped quartz glass block 6 will be smoothed in this process, whereby material losses are reduced. The result is schematically shown in FIG. 2(e).

After cooling the melt mold 1 is opened and the semifinished product 6 is removed in the form of a hollow cylindrical quartz glass block. Said block has an outer diameter of about 450 mm, an inner diameter of 50 mm, and a length of 550 mm, and it is distinguished by the absence of bubbles and by substantial freedom from striae. It is particularly suited for the production of quartz glass components for semiconductor manufacture, for instance flanges and wafer carriers, which are used in an environment showing a corrosive or etching action.

FIG. 3 schematically shows a typical temperature profile of the heating zone 4 for the shaping method according to the invention, as in the embodiment explained above in more detail. Phases (a) through (d) of the temperature profile are assigned to the method steps described above with reference to FIG. 2, namely sintering (a), first shaping step (b), second shaping step (c), and third shaping step (d).

The invention claimed is:

1. A method for producing a semifinished product of synthetic quartz glass by plastic deformation of a softened $SiO_2$ mass in a melt mold, said method comprising the following steps:
   (a) providing a porous $SiO_2$ soot body,
   (b) zonewise sintering of the $SiO_2$ soot body in the melt mold at a sintering temperature and during a sintering period so as to form a completely sintered transparent quartz glass body, and
   (c) shaping the sintered quartz glass body by softening the sintered quartz glass body in the melt mold so as to form a viscous quartz glass mass that fills the volume of the melt mold entirely or partly, and
   (d) cooling the quartz glass mass and removing the mass from the melt mold so as to form the semifinished product; and
      wherein the sintering starts from a top of the soot body and proceeds downwards, and the shaping starts from a bottom of the sintered quartz glass body and proceeds upwards.

2. The method according to claim 1, wherein said shaping is performed in a heating zone having a length not more than half the length of the quartz glass body to be shaped.

3. The method according to claim 1, wherein during zonewise sintering the soot body is supplied to a heating zone at a feed rate in a range between 2 mm/min and 10 mm/min from the bottom to the top, and the sintering temperature is set in a range between 1400° C. and 1600° C.

4. The method according to claim 1, wherein said shaping of the sintered quartz glass body comprises a first shaping step during which a lower portion of the quartz glass body is shaped at a first softening temperature, and a second shaping step in which an upper portion of the quartz glass body is shaped at a second softening temperature, said first softening temperature being lower on average than said second softening temperature on average.

5. The method according to claim 4, wherein the first softening temperature in the first shaping step is increased, starting from the sintering temperature prevailing after completion of the sintering step, at a heating rate between 0.01° C./min and 0.08° C./min until the first softening temperature is higher within than the sintering temperature by a temperature difference in a range of 20° C. to 100° C.

6. The method according to claim 4, wherein the softening temperature in the second shaping step is increased, starting from the lower softening temperature prevailing after completion of the first shaping step, at a heating rate between 0.08° C./min and 0.5° C./min until it is higher within the range of 20° C. to 150° C. than the lower softening temperature.

7. The method according to claim 4, wherein shaping of the sintered quartz glass body comprises a third shaping step at a substantially constant softening temperature for a period of time of from 15 min to 200 min.

8. The method according to claim 7, wherein the shaped quartz glass body is uniformly heated over its whole length in the third shaping step.

9. The method according to claim 1, wherein the soot body is dried in a chlorine-free atmosphere that is either vacuum or an inert gas stream.

10. The method according to claim 1, wherein the soot body has an inner bore into which an elongated carrier body extends during sintering according to method step (b) and during vitrification according to method step (c).

11. The method according to claim 1, wherein prior to sintering according to method step (b) the soot body has a density ranging from 490 kg/m$^3$ to 640 kg/m$^3$.

12. The method according to claim 1, wherein prior to sintering according to method step (b) the soot body has a ratio L/m<that is less than 20 mm/kg, where L is a length of the soot body and m is a mass of the soot body.

13. The method according to claim 1, wherein prior to sintering according to method step (b) the soot body is fitted into the melt mold so as to create a surrounding gap with a width of not more than 50 mm relative to the inner wall of the melt mold.

14. The method according to claim 1, wherein the melt mold has a side wall composed of at least two segments held together by at least one externally surrounding clamping ring.

15. The method according to claim 1, wherein the melt mold has an inner wall lined at least in an area of a side wall thereof with sheet-like graphite.

* * * * *